Sept. 27, 1955

H. G. ANASTASIA 2,718,783

RATE OF CHANGE OF PRESSURE AND PRESSURE
MEASURING INDICATING INSTRUMENT

Filed Sept. 29, 1950

INVENTOR.
HARRY G. ANASTASIA
BY

ATTORNEY

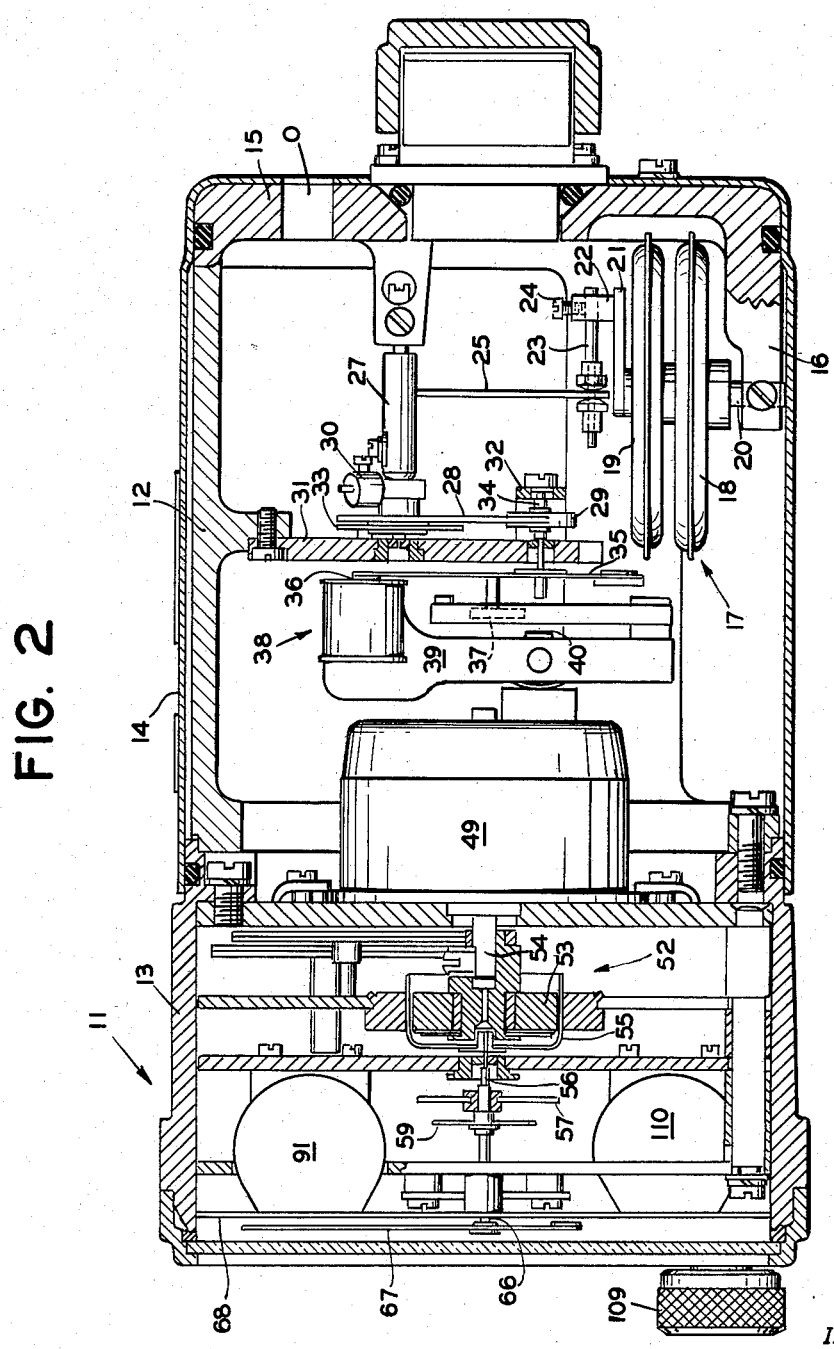

Sept. 27, 1955         H. G. ANASTASIA                2,718,783
           RATE OF CHANGE OF PRESSURE AND PRESSURE
                MEASURING INDICATING INSTRUMENT
Filed Sept. 29, 1950                       4 Sheets-Sheet 3

FIG. 4

INVENTOR.
HARRY G. ANASTASIA
BY
ATTORNEY

Sept. 27, 1955   H. G. ANASTASIA   2,718,783
RATE OF CHANGE OF PRESSURE AND PRESSURE
MEASURING INDICATING INSTRUMENT
Filed Sept. 29, 1950   4 Sheets-Sheet 4

*INVENTOR.*
HARRY G. ANASTASIA
BY
*ATTORNEY*

United States Patent Office 2,718,783
Patented Sept. 27, 1955

2,718,783

RATE OF CHANGE OF PRESSURE AND PRESSURE MEASURING INDICATING INSTRUMENT

Harry G. Anastasia, Paramus, N. J., assignor to Bendix Aviation Corporation, Teterboro, N. J., a corporation of Delaware Application September 29, 1950, Serial No. 187,524

7 Claims. (Cl. 73—179)

This invention relates to rate of change of pressure measuring indicating instruments for use aboard an aircraft and more particularly to instruments adapted for indicating the altitude as well as the rate of change of altitude of an aircraft.

In general, instruments of this type utilize a movable pressure responsive member, usually an aneroid, sensitive to varying external craft pressures for operating, through a mechanical linkage and a gear train, a pointer relative to a calibrated dial. In practice, it has been found that this construction is unsatisfactory because insufficient power is transmitted to the pointer from the aneroid thereby resulting in unsatisfactory readings. It has also been found that this purely mechanical arrangement does not effect a smooth and continuous rotation of the pointer but rather there is a tendency for the pointer to move erratically or pulsatingly over the dial face. These conditions make it difficult for the pilot of an aircraft to determine the true conditions under which the craft is operating.

In rate of climb indicators, in particular, it is generally the practice to use an aneroid capsule having a capillary leak connection to govern the rate of expansion or contraction of the aneroid in response to varying external pressures. The capillary leak is so designed as to effect a measure of the rate of change of altitude. However, this again has proved unsatisfactory because due to the nature of the calibrated leak, indications of the rate of climb are correct only up to a limited elevation, generally about 35,000 feet above sea level. Thus, aircraft exceeding this limit cannot depend upon conventional instruments to correctly show the rates of climb or descent.

The present invention embodies a novel combined indicator enclosed within a single casing for indicating the altitude as well as the rate of climb or descent of aircraft so that the pilot may observe these conditions by observing a single instrument. Disposed within the casing of the indicator hereof is a pressure responsive member which is subjected to ambient pressure at the altitude at which the craft is travelling, the pressure responsive member actuating a vane member to unbalance a balanced electrical field set up by the windings of an electromagnet. The unbalancing of the field initiates a signal which is impressed upon a reversible low inertia motor drivably connected to a rate of climb pointer and an altitude counter. The dial face of the indicator is provided with graduated indicia and includes a pair of slots for exposing to view the altitude counter and a barometric pressure counter which indicates the barometric pressure condition for the altitude counter setting. A barometric pressure knob located on the front of the casing provides the means for manually actuating the barometric pressure counter and the altitude counter.

An object of the present invention, therefore, is to provide a novel combined altitude and rate of climb indicator for aircraft.

Another object of the invention is to provide a novel altimeter using an electric motor to indicate elevation.

A further object is to provide a novel rate of climb indicator which does not utilize a capillary leak connection.

Still another object is to provide a novel indicator which effects two indications as a result of the actuation of a single pressure responsive member.

A further object is to provide a novel and improved instrument which embodies a combined altimeter and rate of climb indicator mechanism.

Another object is to provide a novel, simple and effective indicating instrument wherein a pressure responsive member actuates electrical means for simultaneously operating a pair of indicating means, thus greatly increasing the power which is available for driving heavier elements of the mechanism.

Still another object is the provision of an electrical pick-up system which is influenced by a pressure responsive member for operating a motor drivably connected to a pair of indicating members.

A further object is to provide a novel indicating instrument wherein a pressure responsive member actuates an electrical pick-up system which energizes a motor to drive an altitude counter and a rate of climb pointer.

Another object is to provide an aneroid actuated vane for unbalancing a balanced electrical system whereby a signal is impressed on a reversible motor which acts through a magnetic drag coupling to simultaneously drive an altitude counter and a rate of climb pointer.

A still further object is to provide a novel indicating instrument wherein a pressure responsive actuated mechanism is utilized for driving an altitude counter which is impressed with a barometric pressure correction by a driving means operating independently of the pressure responsive actuated mechanism.

Another object is to provide a novel indicating instrument having a dial face for exposing to view the altitude, rate of climb and the barometric pressure at which an air craft is travelling.

Still another object is to provide a novel and improved indicating instrument which utilizes a novel limit switch in conjunction with an electrical pick-up system.

The above and other objects and advantages of the present invention will appear more fully hereinafter from a consideration of the detailed description which follows, taken together with the accompanying drawings wherein one embodiment of the invention is illustrated.

In the drawings, wherein like reference characters refer to like parts throughout the several views, Fig. 1 is a front elevational view of the novel indicator of the present invention.

Fig. 2 is a cross-sectional view of the indicator of Figure 1 showing portions thereof cut-away to afford a clearer view of the operating mechanism therefor.

Fig. 4 is a detailed schematic illustration of gear train and operating linkage for actuating the altitude and barometric pressure counters and the rate of climb pointer.

Fig. 7 is an elevational front view of the safety limit switch as incorporated in the pick-up system, while

Figure 1:
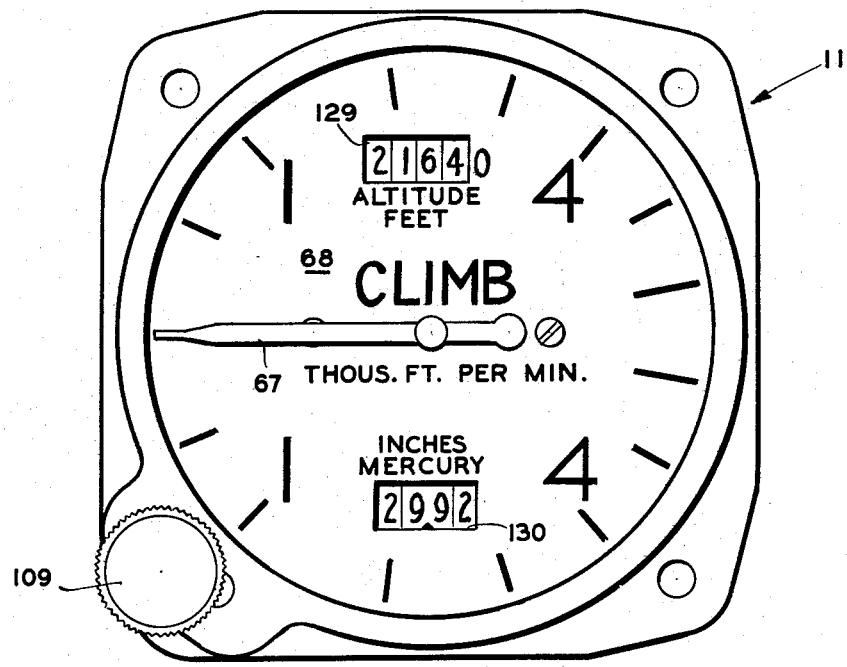

Referring now to the drawings for a more detailed description of the present invention and more particularly to Figures 1 and 2 thereof, the novel indicator hereof is generally designated by the numeral 11. The indicator 11 comprises a casing divided into two cast metal sections 12 and 13 which are encased by a suitable cover 14. Rear section 12 is formed with an end wall 15 having a depending finger portion 16 which extends partially into section 12. A pressure responsive member or aneroid 17 consisting of a pair of evacuated capsules 18 and 19 is supported on the finger portion 16 by a post 20 fastened thereto. The top of capsule 19 has secured to its central portion for movement therewith an arm 21 which is integrally formed with an apertured stud 22 at one end. Stud 22 is adapted to slidably receive an adjustable bimetallic strip 23 and a slotted screw 24 for adjustably securing the strip 23 in the stud.

The bimetallic strip 23 is provided to compensate for changes in temperature affecting the aneroid 17. This is necessary where conditions are such that an aircraft travelling at one elevation encounters variations in temperature or temperature inversions. Under these conditions the strip 23 will aid the aneroid in transmitting correct movements.

Figure 3:
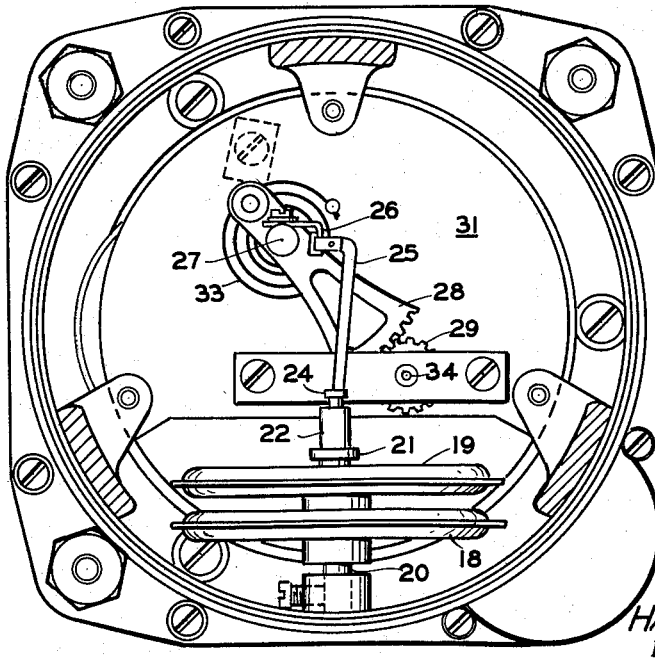
Fig. 3 is a rear elevational view of the indicator with the outer casing removed.

Secured to the strip 23 is a lever 25 forming part of a rock shaft assembly. A bimetallic strip 26 (Fig. 3) is fastened to the other end of lever 25 and to a rock shaft 27 carrying a toothed segment 28 which engages a gear 29. The strip 26 compensates for temperature variations affecting the rock shaft assembly. Shaft 27 is counterbalanced by a weight 30 and is journalled at one end in a wall 31 which has affixed thereto a bracket 32. A hairspring 33 having one end fastened to the shaft 27 biases the shaft to take up the backlash of the gears and the free play in the aforementioned linkage. Suitably journalled in the wall 31 and bracket 32 is a shaft 34 which has pinned thereto gear 29. The shaft 34 extends through wall 31 and has fixedly mounted thereon a counterweighted rotatable vane 35 having an iron tip 36 of magnetizable material. From the foregoing construction, it is readily apparent that expansion or contraction of the aneroid 17 will transmit motion through the described structure to effect angular displacement of the vane 35 from its null or normally centered position as seen in Fig. 2 in either a clockwise or counter-clockwise direction.

Pressure responsive devices such as aneroids are well known to those skilled in the art for their sensitivity to changes in pressure, and for being especially suited for measuring the varying density of air at different altitudes. Aneroid 17 is subjected to the static air pressure of the altitude at which the craft operates by means of an opening "O" formed in the end wall 15 (Fig. 2) communicating with the static chamber of a Pitot tube (not shown) open to the atmosphere. Inasmuch as the decrement and increment changes of pressure of air varies at different altitudes, the relative movement between the capsule and a foot level indicator must be gradually increased upon increases in altitude. This non-linear condition is accounted for in calibrating the aneroid 17 so that the deflection curve of the diaphragms versus the altitude is a straight line.

Figure 5:
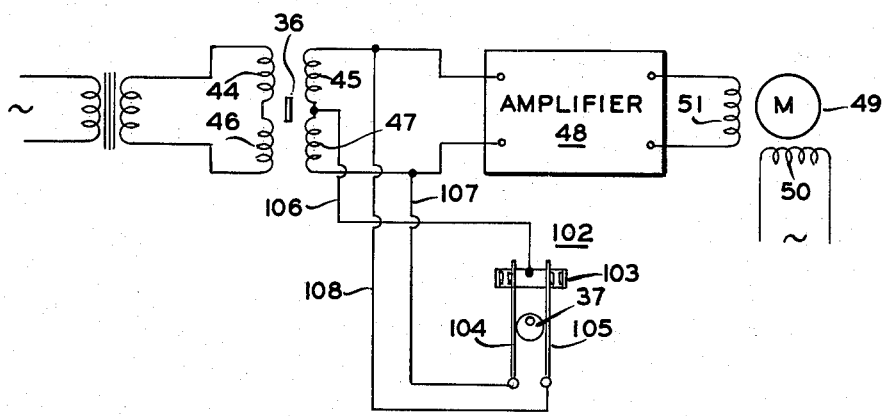
Fig. 5 is a schematic illustration of the electrical pick-up system.
Figure 6:
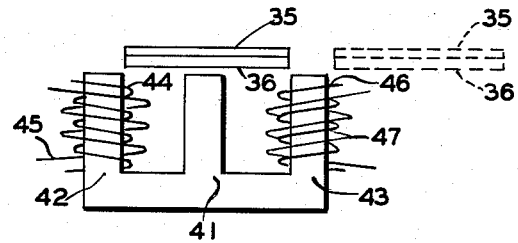
Fig. 6 is a diagrammatic illustration of a portion of the electrical pick-up members.

The vane 35 has mounted thereon a cam shaped member 37 for a purpose to be described presently. Disposed adjacent to the vane 35 and adapted for angular displacement in a plane parallel to vane 35 is an electric pick-up or electromagnet assembly 38 mounted on a pivoted arm 39 pinned to a shaft 40. The electromagnet assembly 38 comprises an E-shaped core 41 of suitable magnetic material having outside arms 42 and 43. Arm 42 carries primary and secondary windings designated with the numerals 44 and 45, respectively, while arm 43 carries primary and secondary windings designated with the numerals 46 and 47, respectively (Fig. 6). The primary windings 44 and 46 are connected in series aiding and are supplied from a conventional transformer connected to a suitable source of alternating current while the secondary windings 45 and 47 are connected in series opposition so that normally the voltages in the secondaries buck each other to effect zero output (Fig. 5). When the iron tip 36 of vane 35 is directly in line with the middle leg of core 41 there is the same amount of flux in both outside arms of the core so that the voltages induced in the opposed windings 45 and 47 balance to effect a zero output. If the vane 35 is not aligned with the core 39, i. e., iron tip 36 is closer to one arm, the iron tip of the vane causes more flux in that arm of the core than the other to thereby unbalance the balanced field and a resultant voltage is thereby induced in the secondaries. The polarity of the induced resultant signal depends upon the polarity of the secondary windings and which secondary winding predominates. The voltage or unbalance induced in the secondary windings is led to a conventional amplifier 48 (Fig. 5) which amplifies the low signal to a value high enough to operate a two phase low inertia reversible motor 49. The motor 49 has a fixed phase winding 50 supplied with alternating current and a variable phase winding 51 energized by the amplifier 48. The motor 49 may be rotated in either a clockwise or counter-clockwise direction depending upon the polarity of the signal impressed on the winding 51 by the amplifier 48. In this manner, expansion or contraction of aneroid 17 determines the direction of displacement of vane 35 to effect rotation of motor 49, and the pick-up system is so arranged that the resultant direction and speed of the motor 49 is a function of the direction and extent of vane displacement.

Motor 49 transmits rotation to a magnetic drag coupling 52 which consists of a ring-shaped magnet 53 fixed to the motor output shaft 54 rotatable in a metallic cylinder or cup 55 having a shaft 56 secured thereto biased by a hairspring 57. Rotation of motor shaft 54 angularly displaces shaft 56 by inducing eddy currents in cylinder 55 in a manner well known to those skilled in the art.

The output of drag coupling 52 is transmitted to a logarithmic linkage 58 (Figure 4) through shaft 56 and a gear 59 pinned thereto which meshes with a gear 60 secured to a shaft 61 provided with a lever 62 rotatable therewith. The logarithmic linkage 58 per se consists of a pin 63 staked to lever 62 and a closed wire loop 65 in which the pin rides. In this manner, the output of shaft 56 is nonlinearly transmitted to a pointer shaft 66 connected to wire loop 65 and rotatable therewith for a reason to be discussed presently. Pointer shaft 66 drives a rate of climb pointer 67 which moves coaxially with respect to a compressed dial face 68 impressed with graduated indicia unequally spaced so that the numerical rate of increase of the indicia on the dial becomes greater as it approaches the highest numeral thereon. This arrangement of indicia is provided so that dial face 68 is more sensitive for indications up to 1500 feet inasmuch as a plane normally operates within this range, that is, from 0 to 1500 feet. Since the motor 49 provides a direct indication of the rate of climb and is drivably connected to the pointer 67, the pointer must be driven through the logarithmic linkage 58 in order to conform to the non-linear spacing of indicia on dial face 68. By reason of the electrical actuation of the pointer 67, it is apparent that rate of climb indications are instantaneously transmitted so that the pilot may determine the rate of change of craft altitude as soon as the plane begins to ascend or descend.

As noted previously, the motor 49 also operates to give an indication of the altitude at which the craft is operating. To this end, motor shaft 54 is provided with a gear 69 (Fig. 4) which meshes with a relatively large gear 70 located on a shaft 71 which also carries a pinion 72. Pinion 72 in turn engages a gear 73 mounted on a shaft 74 which has sleeved thereon a gear 75. The gear 75 engages a gear 76 in mesh with a relatively large gear 77 fixed to a short sleeved member 78. Sleeve 78 also carries a gear 79 which meshes with a planetary gear 80 mounted on a stub shaft 81 in a relatively large gear 82 integrally formed with a sleeve 83 rotatable with respect to a shaft 84. The stub shaft 81 carries a gear 85 which engages a toothed hub 86 formed on shaft 84. Gear 82 drives a gear 87 mounted on a shaft 88 which has affixed thereto a relatively large gear 89. Located at right angles to the gear 89 and in engagement therewith is a crown gear 90 which actuates an altitude counter 91 shown schematically in Figures 2 and 4. By reason of the foregoing construction, it is readily apparent that the altitude counter reading is a direct indication of the angular displacement of the vane 35 and actuated thereby.

The operation of the planetary gearing is accomplished in the following manner:

Since the short sleeve 78 is loosely mounted on sleeve 83, rotation of the sleeve 78 by gears 76 and 77 rotates gears 80 and 85 by means of gear 79 which effects rotation of stub shaft 81 thereby rotating sleeve 83 along with gear 82. Shaft 84 is stationary when knob 109 is inactive. The gear 85 will therefore revolve around gear 86 to aid in the rotation of stub shaft 81. Motion is then transmitted from gear 82 through gears 87, 89 and crown gear 90 for operating altitude counter 91.

In order to return the electrical pick-up 38 to an electrical null or balanced field condition with respect to vane 35 whereby no signals will be available for energizing the motor 49 upon the aircraft assuming a level flight condition, follow-up means are provided for directly gearing the pick-up member 38 to the motor shaft 54 to displace the pick-up in a direction approaching the vane 35. To this end, motor shaft 54 allows the pick-up support 39 to follow up the vane 35 through the following gear train: Gear 69 drives the relatively large gear 70 mounted on shaft 71. Shaft 71, as described previously, transmits rotation thereof to shaft 74 through gears 72 and 73. Sleeved gear 75 besides meshing with gear 76 also engages a relatively large gear 92 mounted on a shaft 94 which carries a pinion 93 thereon. Shaft 94 transmits its rotation to a shaft 97 through gear 95 mounted coaxially with respect to a pinion 96 on shaft 97. The pinion 96 drives a shaft 99 through a gear 98 in mesh therewith and the shaft also is provided with a pinion 100 which engages a gear 101. Gear 101 is secured to shaft 40 of the pick-up support member 39 and upon actuation thereof will angularly displace support 39. Thus, when vane 35 is displaced by aneroid 17, the signal induced in the pick-up windings 45 and 47 resulting from the unbalanced field condition energizes motor 49 to actuate the rate of climb pointer 67 and altitude counter 91, and, in addition, the pick-up 39 is actuated and displaced relative to the vane 35 to wipe out the control signal and thereby de-energize the motor. The latter described gear train, therefore, constitutes a mechanical follow-up connection for the pick-up.

Figure 7:
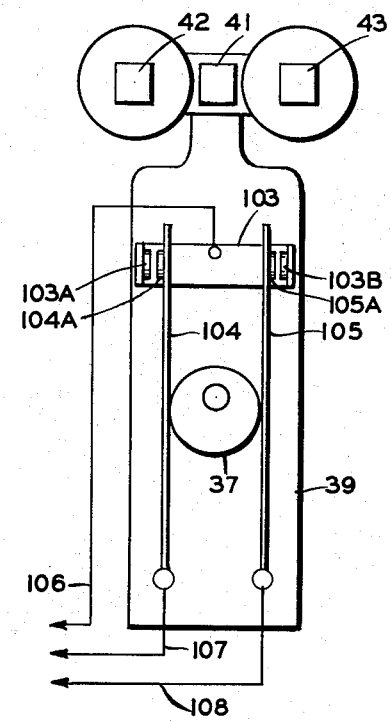

To aid in the efficient operation of the instrument, a limit switch generally designated by the numeral 102 has been provided. Switch 102 is incorporated into the electrical pick-up system to provide for certain conditions whereby a pilot in ascending or descending to a certain elevation may forget to switch in the amplifier 48. Under these conditions, the vane 35 as actuated by the aneroid 17 will move outside of the fields of the pick-up windings (as shown in Figure 6), and, since the motor 49 is not energized unless the amplifier is operating, the pick-up assembly 38 will not follow-up the movement of the vane. In addition, assuming that the limit switch 102 is not provided, when the pilot switches in the amplifier 48 the motor will remain un-energized because the iron tip 36 of the vane being outside the magnetic field will not unbalance the balanced field condition of the windings whereby a resultant signal may be impressed on the amplifier to drive the motor 49 and the follow-up connection. To correct for this condition the limit switch 102 (Figure 7) is provided. The switch 102 comprises a substantially U-shaped member 103 suitably mounted on the pivoted member 39 and having electrical contacts 103A and 103B. Operable for transverse movement and parallel to each other within the arms of contact 103 are a pair of flat thin flexible spring-like members 104 and 105 having contacts 104A and 105A, respectively, which are adapted to contact their adjacent contacts 103A and 103B, respectively, of the U-shaped member 103. The cam-shaped member 37 mounted on the vane 35 is normally positioned between the members 104 and 105 and upon movement to the left or right (as viewed in Figure 7) will force one or the other contacts against the contacts of the arms of member 103. Thus, if pick-up member 39 remained stationary, cam 37 upon movement of vane 35 to left (Figure 7) would force contact 104A against contact 103A of member 103, and the vane in moving in the opposite direction, would force the contact 105A to abut the other contact 103B. The dimensions of the cam 37 and the flexibility of the members 104 and 105 are such that the members 104 and 105 may be flexed to an appreciable limit without danger of the members breaking.

U-shaped member 103 is connected to a point between the secondary coils 45 and 47 by a lead 106 while contact 104A is connected to one side of winding 47 by lead 107 and contact 105A is connected to one side of coil winding 45 by lead 108. Thus, it will be apparent that with vane tip 36 in a position where it has no influence on the pick-up device, the voltages in both secondaries will be equal and opposite. On engagement of contacts 103B and 105A, secondary 45 will be shorted out so that the induced signal of secondary 47 will energize the motor to operate in one direction and on engagement of contacts 103A and 104A, secondary 47 will be shorted out so that the induced signal of secondary 45 will energize the motor to operate it in an opposite direction.

If we assume the condition previously mentioned, i. e., that a pilot forgets to switch in the amplifier until the plane reaches, for purposes of illustration, an elevation of 15,000 feet, the aneroid 17 will have been deflected to displace the vane 35 to a position outside the effective range of the windings on core 41 to the dotted line position in Figure 6. At this point, the motor 49 will not be energized because the amplifier 48 is not in operation and no change in elevation or rate of climb will be effected. However, when the amplifier is switched in by the pilot, the motor 49 will become energized because cam 37 will have moved with the vane 35 to force 105A against the adjacent contact 103B of member 103 to short circuit secondary 45. Thus, if we assume that the voltage impressed on the amplifier 48 from winding 47 is of a polarity to run the motor 49 in a direction to move the pick-up assembly 38 toward the vane the motor will run under the influence of the signal of secondary 47 until pick-up 38 has been moved to a position relative to vane 35 where cam 37 permits contact 105A to disengage contact 103B removing the short previously applied to secondary 45. Thereafter, vane tip 36 now being positioned in the influencing range relative to the secondaries, motor control is effected by the relative positions of the vane tip. In addition, the motor will have also actuated the altitude counter 91 to give an indication of 15,000 feet. In like manner, when the amplifier is accidentally rendered inoperative, and the plane begins to descend to a point where the vane 35 is adjacent to but outside the field of the winding 47, the amplifier upon becoming energized by actuation of a switch not shown, runs the motor 49 in the proper direction to move member 39 toward vane 35 as a result of the engagement of contact 103A by contact 104A, the latter having been moved to "make" position by vane 35. Thus, it is readily apparent that by shorting one or the other of windings 45 and 47 by the limit switch, amplifier 48 will be enabled to "sense" the direction in which the member 39 must be moved to bring the iron tip 36 of the vane to a null position.

Means are provided in the indicating instrument 11 for disclosing the setting the barometric pressure in inches of mercury. To this end a barometric pressure setting of knob 109 (Figure 4) is provided for rotating a barometric pressure counter 110. Knob 109 is suitably mounted on a shaft 111 which carries a pinion 112 secured thereto and the latter meshes with a gear 113 fixedly held to a resiliently urged bushing 114 loosely mounted on a screw shaft 115. Located on bushing 114 is a gear 116 which meshes with a pair of spaced gears 117 and 118. Gear 117 is mounted on a shaft 119 which also carries a gear 120 in mesh with a gear 121. Gear 118 and its attachments are free to rotate on a shaft 119. Gear 121 serves to drive the barometric pressure counter 110. Thus, through the gear train just described the knob 109 is directly geared with the counter 110 to drive the latter.

In operating aircraft, it is essential for the pilot to know the elevation of the landing field or the elevation of any other known point on the earth's surface so that the altitude counter will provide a reading representing the distance between the ground at such point and the aircraft. To this end, means are provided for impressing a barometric pressure correction on the reading of the altitude counter 91. Futhermore, in order to provide for the non-linear relation between altitude and pressure a variable ratio drive is incorporated in the instrument. These two last mentioned means comprise a pair of rotatable drum-like members 122 and 123 mounted on their respective shafts 119 and 84. Drum 122 is loosely mounted on shaft 119 which is driven by gear 118 while drum 123 is mounted on shaft 84. The drum 122 has fixed thereto the ends of a pair of flexible metallic tapes 125 and 126 which are fixed at their opposite ends to the other drum 123. By means of the foregoing arrangement, the knob 109 not only drives the barometric pressure counter 110 but also drives shaft 84 through the tapes 125 and 126. Large gear 82 being carried on shaft 84 picks up the motion transmitted to shaft 84 and drives pinion 87 to rotate shaft 88 and gears 89 and 90 thereby driving altitude counter 91 to receive the barometric pressure correction. It is to be noted that rotation of knob 109 will not rotate the motor shaft 54 because of the planetary gear system previously described, wherein the rotation of shaft 84 and gear 79 rotates gear 80 on stub shaft 81 which in turn allows gear 85 to revolve around gear 86 to rotate gear 82. Since sleeve 78 is not secured to sleeve 83, motor shaft 54 will remain stationary, because of mechanical loading such as friction, when drum 123 and shaft 84 are rotated in driving altitude counter 91.

The variable ratio drive consisting of drums 122 and 123 and tapes 125 and 126 is constructed and arranged to provide compensation to the altitude counter for the non-linear relation between altitude and pressure. The drums are made in two sections 122A, 122B and 123A, 123B (Figure 8) and tensioned by means of springs to keep the sections and tapes 125, 126 separate. However, the two sections of each drum rotate as one unit, sections 122A and 122B being connected together by any suitable means (not shown) such as a pin, spline or weld. Section 123A is loosely mounted on shaft 84 but rotates together with section 123B which is fixed to the shaft because of the action of the tapes and the torsions of the spring within the drum 123 consisting of the two sections 123A and 123B.

Because of tolerance in the component members, such as tape thickness, diameter of drums, etc., it is necessary to introduce a resilient member, such as the torsion spring in drum 123A and 123B, whereby the lineal travel of both tapes is equal, otherwise damage would result.

Figure 8:
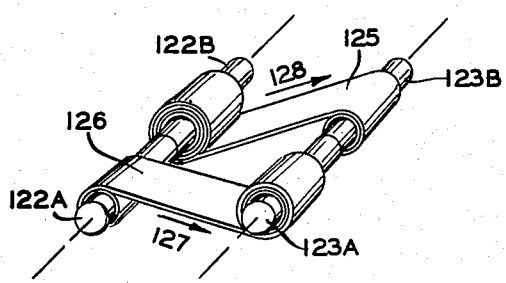
Fig. 8 is a diagrammatic illustration of a portion of the barometric compensating mechanism.

The ends of tapes 125 and 126 are arranged on the drums in the manner shown in Figure 8. If the drum 122 is rotated counter-clockwise, the tape 126 will build up on section 122A and unwind on section 123A while tape 125 will unwind on section 122B and build up on section 123B. However, unless the tapes are tensioned in some manner the tape 125 will slacken on counter-clockwise rotation of drum 122 while upon clockwise rotation of drum 122 the tape 126 will become slack. To overcome this condition, the tape 126 is tensioned in the direction of the arrow 127 while tape 125 is tensioned in the same direction as indicated by arrow 128. Thus, when drum 122 is rotated counter-clockwise, tape 126 will remain taut inasmuch as it is pulled by the drum and tensioned opposite the direction of movement; tape 125 on the other hand, will also remain taut because the tension therein will allow tape 125 to build up on section 123B. When drum 122 is rotated in a clockwise direction, tape 126 will build up on drum 123A due to the tension in the tape while tape 125 will build up on section 122B. In this manner, motion is transmitted between the shafts 119 and 84 accurately and efficiently.

Due to the ratio of rotation between the shafts 84 and 119 by the build up of tapes 125 and 126 on drums 122 and 123 the altitude-pressure curve is simulated to effect a proper correction to the altitude counter. The peripheral variations in the building up of the tapes on the drum is so calibrated that this will effect a simulated altitude pressure curve. It is readily apparent that the tension caused by the built up tapes on their respective drums will effect a ratio of rotation of the shafts to correctly result in the desired curve.

Means are also provided whereby the altitude counter 91 may be adjusted without actuating the barometric pressure counter 110 when the two counters are out of phase. This is accomplished by inserting the end of a suitable tool in a kerf formed in shaft 115 and rotating the same. Rotation of the shaft 115 displaces the shaft axially so that gear 116 which formerly engaged both gears 117 and 118, only engages gear 118 without disturbing gear 117, to thereby rotate the altitude counter alone.

The dial face 68 of the indicator is conveniently provided with a pair of slots 129 and 130 which expose to view the altitude counter reading in feet and the barometric pressure reading in inches of mercury. By reason of this arrangement, the pilot is immediately informed of the altitude at which the craft is operating, the barometric pressure setting for a certain known point on the earth's surface and the rate of climb of the craft.

The altitude and barometric counters 91 and 110 have not been shown or described in detail inasmuch as they are of conventional design and an understanding of the present invention is readily apparent without further elaboration thereon. Gears 70, 73, 92, 95, 98 and 101 are shown split into two sections in order to take up back lash in the gear train.

It may be seen that the present invenion provides a single instrument whereby altitude and rate of climb indications are instantaneously and simultaneously accessible to an aircraft pilot. In addition, a pressure responsive member initiates a single force which is transmitted through the described mechanisms to effect a plurality of indications.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. A pressure responsive instrument for indicating changes in pressure occurring exteriorly of the instrument, comprising a yieldable wall movable in response to a change in said pressure, a displaceable indicating member, a motor for displacing said indicating member, a pivoted member of magnetizable material movable with said wall, an electromagnet mounted on a movable arm movable coaxially of said pivoted member, said electromagnet having windings thereon normally electrically balanced to produce zero output and adapted to produce a control signal to drive said motor when the pivoted member is out of null position but within the effective magnetic range of said windings, and switching means connected in circuit with said windings and said motor, said switching means being mounted on said movable arm and pivoted member, said motor being activated by said switching means when said pivoted member is beyond the effective range of said windings to displace said electromagnet to a position within the effective range of said windings, whereby, there is again developed a control signal to restore the electromagnet to a null position.

2. In an instrument of the type described for use in aircraft, an altitude counter, a barometric pressure counter, means for setting said barometric pressure counter and simultaneously impressing said setting on said altitude counter including a variable ratio drive, said variable ratio drive comprising, a pair of drums spaced from one another, a pair of flexible tapes each having opposite ends thereof connected to said pair of drums, each tape being wound clockwise on one drum and counterclockwise on the other, with the clockwise winding of one tape being located on the same cylinder as the counterclockwise winding of the other tape.

3. An altimeter compensator for compensating an altitude indicator for the non-linear relation between altitude and pressure comprising, a barometric pressure device, an altitude device, and a variable ratio drive coupling said devices to correlate information of said devices; said variable ratio drive comprising, a pair of cylinders spaced from one another, a pair of flexible tapes each having opposite ends thereof anchored to said cylinders, each tape being wound clockwise on one drum and counterclockwise on the other, with the clockwise winding of one tape being located on the same cylinder as the counterclockwise winding of the other, the characteristics of said tapes and cylinders being such that the resultant ratios therebetween follow the non-linear altitude-pressure curve relation.

4. In an instrument for indicating the altitude and rate of climb of an aircraft, a casing, a dial mounted in said casing and bearing rate of climb designations thereon, an indicator movable relative to said dial for indicating the rate of climb of the craft, altitude indicating means accommodated by said dial and visible to an observer, a pressure responsive member exposed to changing ambient pressures, interconnecting means for interconnecting said pressure responsive member, said indicator and said altitude indicating means, said interconnecting means being operable by the pressure responsive member when the latter is exposed to changing ambient pressures for actuating said indicator in accordance with the rate of change and said altitude indicating means in accordance with the amount of change, a barometric pressure counter, and pressure-altitude curve corrector means coupling said barometric pressure counter with said altitude indicating means to correlate the different dimension units presented by said barometric pressure counter and said altitude indicating means.

5. A device of the kind as set forth in claim 4, wherein the pressure-altitude curve corrector means include a pair of drums, a pair of flexible tapes each having opposite ends thereof anchored to said drums, each tape being wound clockwise on one drum and counterclockwise on the other, with the clockwise winding of one tape being located on the same drum as the counterclockwise winding of the other, the characteristics of said tapes and drums being such that the resultant ratios therebetween follow the non-linear altitude-pressure curve relation.

6. A pressure responsive instrument for indicating changes in pressure occurring exteriorly of the instrument, comprising an aneroid responsive to said changes in pressure, an indicating member, and coupling means coupling said aneroid to said indicating member; said coupling means including a motor, coupling means coupling the output of said motor to said indicating member, a movable arm, electromagnetic means mounted on said movable arm and having windings connected to the input of said motor, a displaceable member of magnetizable material coupled to said aneroid and disposed at a null position of said electromagnetic means and adapted to produce a control signal to drive said motor when said displaceable member is moved from said null position, and switching means circuitously connected with said windings and responsive to movement of said displaceable member when the displaceable member is beyond the effective range of said windings to energize same and thereby actuate said motor to displace said electromagnetic means sufficiently to again develop a control signal to restore said electromagnetic means to a null position.

7. A pressure responsive instrument for indicating changes in pressure occurring exteriorly of the instrument, comprising an aneroid responsive to said changes in pressure, an indicating member, and coupling means coupling said aneroid to said indicating member; said coupling means including a motor, magnetic coupling means coupling the output of said motor to said indicating member, a movable arm, electromagnetic means mounted on said movable arm and having windings connected to the input of said motor, a displaceable member of magnetizable material coupled to said aneroid and disposed at a null position of said electromagnetic means and adapted to produce a control signal to drive said motor when said displaceable member is moved from said null position, and switching means connected with said windings and responsive to movement of said displaceable member when the displaceable member is beyond the effective range of said windings to energize same and thereby actuate said motor to displace said electromagnetic means sufficiently to again develop a control signal to restore said electromagnetic means to a null position.

References Cited in the file of this patent

UNITED STATES PATENTS

| | | |
|---|---|---|
| 1,664,417 | Hunt et al. | Apr. 3, 1928 |
| 1,921,983 | Wittkuhns | Aug. 8, 1933 |
| 1,935,736 | Colvin et al. | Nov. 21, 1933 |
| 1,970,544 | Carbonara | Aug. 21, 1934 |
| 2,349,118 | Simpson | May 16, 1944 |
| 2,357,745 | Kliever | Sept. 5, 1944 |
| 2,437,064 | Andressen, Jr. | Mar. 2, 1948 |
| 2,445,335 | Philbrick et al. | July 20, 1948 |
| 2,484,022 | Esval | Oct. 11, 1949 |
| 2,503,091 | Brooke Jr. et al. | Apr. 4, 1950 |
| 2,531,492 | Angst et al. | Nov. 28, 1950 |
| 2,552,377 | Jenny | May 8, 1951 |
| 2,557,856 | Angst et al. | June 19, 1951 |
| 2,598,681 | Garbarini et al. | June 3, 1952 |

FOREIGN PATENTS

| | | |
|---|---|---|
| 884,484 | France | Apr. 27, 1943 |

OTHER REFERENCES

Serial No. 284,328, Kohler et al. (A. P. C.), published May 4, 1943.